United States Patent [19]

Kurz

[11] 4,363,902

[45] Dec. 14, 1982

[54] PROCESS AND HEAVY METAL CATALYST FOR THE POLYMERIZATION OF α-OLEFINS, PARTICULARLY POLYETHYLENE

[75] Inventor: Dieter Kurz, Burghausen, Fed. Rep. of Germany

[73] Assignee: Wacker-Chemie GmbH, Munich, Fed. Rep. of Germany

[21] Appl. No.: 214,704

[22] Filed: Dec. 10, 1980

[30] Foreign Application Priority Data

Mar. 17, 1980 [DE] Fed. Rep. of Germany ....... 3010202
Jul. 8, 1980 [DE] Fed. Rep. of Germany ....... 3025759

[51] Int. Cl.³ ........................... C08F 4/02; C08F 10/00
[52] U.S. Cl. ................................. 526/114; 252/429 B; 252/429 C; 526/116; 526/119; 526/121; 526/122; 526/124; 526/125; 526/352
[58] Field of Search ............... 526/114, 116, 119, 121, 526/122, 124, 125

[56] References Cited

U.S. PATENT DOCUMENTS

| | | | |
|---|---|---|---|
| 4,109,071 | 8/1978 | Berger et al. | 526/125 |
| 4,115,319 | 9/1978 | Scata et al. | 526/125 |
| 4,202,953 | 5/1980 | Matsuura et al. | 526/125 |
| 4,296,223 | 10/1981 | Berger | 526/125 |

FOREIGN PATENT DOCUMENTS

| | | | |
|---|---|---|---|
| 2600593 | 7/1976 | Fed. Rep. of Germany | 526/125 |
| 1154884 | 6/1969 | United Kingdom | 526/119 |
| 1170299 | 11/1969 | United Kingdom | 526/119 |

*Primary Examiner*—Edward J. Smith
*Attorney, Agent, or Firm*—Hammond & Littell, Weissenberger and Muserlian

[57] ABSTRACT

Poly-α-olefins, particularly polyethylene, having a broad molecular-weight distribution, can be prepared in the presence of a catalyst solid which is manufactured in two reaction steps, from a primary solid containing magnesium and chlorine which has been reacted, in a reaction stage A, with alkoxy compounds of elements of Groups I to VI of the Mendeleev Periodic Table which contains at least one secondary or tertiary alkoxy group, and with halogen-containing metal compounds of elements of IV and/or V sub-group(s) of the Mendeleev Periodic Table and, in reaction stage B, with halogen-containing metal compounds of elements of IV and/or V sub-group(s) of the Mendeleev Periodic Table, and-/or metal organyl compounds of metals of the II and/or III main group(s) of the Mendeleev Periodic Table. The sequence of the reaction stages A and B is not critical for the success of the process according to the invention.

16 Claims, No Drawings

PROCESS AND HEAVY METAL CATALYST FOR THE POLYMERIZATION OF α-OLEFINS, PARTICULARLY POLYETHYLENE

BACKGROUND OF THE INVENTION

The polymerization of α-olefins, especially ethylene, in the gaseous phase or in hydrocarbons as diluents and dispersants, with the aid of solid catalysts that contain elements of IV and/or V sub-group(s) of the Mendeleev Periodic Table, magnesium, halogen, oxygen and, optionally, boron or aluminum, and that have been activated with an alkyl aluminum, is known.

Because the properties of the polyolefins thus prepared are very strongly dependent on the catalyst used, various catalyst systems have already been proposed for the polymerization of the α-olefins.

In the polymerization of α-olefins, especially ethylene, the majority of the previously known solid catalysts activated with an alkyl aluminum yield products having a narrow molecular-weight distribution, that is to say, the mean polymerization degree of a polyolefin mixture produced in a polymerization batch lies within a narrow range. This narrow molecular-weight distribution of the polymerizate means that extruded products prepared therefrom have rough surfaces as a result of "melt fractures", so that these polymerizates are unsuitable for many uses, for example, for the manufacture of hollow articles and sheet materials.

The problem was, therefore, to manufacture polyolefins having a broad molecular-weight distribution.

Of the few known catalyst systems that yield products having a broad molecular-weight distribution, the majority cannot be used on an industrial scale because the grain properties of the polymerization product do not satisfy the requirements of the polymerization, working-up or further processing, or because the molecular-weight distribution is not sufficiently broad for many fields of application.

A further group of these catalyst systems has an unsatisfactory catalyst activity so that relatively large quantities have to be employed which pass into the polymerizate, impair its properties, especially its stability, and, therefore, have to be rendered harmless or removed in complicated subsequent processes.

Another group of these known catalyst systems yields products having broadly distributed molecular weights only when the polymerization is carried out in the presence of special activator mixtures, which have to be adhered to accurately, and another group only when the polymerization is carried out in the presence of additional auxiliaries, which subsequently have to be removed from the polymerization medium.

Another group of such known catalyst systems is unsuitable for use on a commercial scale because the physical properties, such as rigidity, impact strength and stress crack resistance, of the shaped articles produced from the polymerization product are inadequate for many purposes.

Some catalysts also discolor the product. These undesirable discolorations are caused chiefly by residual traces of catalyst, which, moreover, in many cases impair the stability of the product to light.

Reference is made to German published application DE-OS No. 26 35 298, which is equivalent to U.S. Pat. No. 4,064,334 in that both claim the same priority, for an example of a previously known catalyst. This catalyst is produced by grinding a mixture of magnesium halide, an alkoxy aluminum halide, a tetravalent titanium compound and a trivalent titanium compound. However, wall deposits are formed during polymerization, and the polymerizates themselves have a poor powder flow behavior, a low bulk density and a high proportion of fines.

OBJECTS OF THE INVENTION

An object of the present invention is to make available a polymerization process for α-olefins, particularly ethylene, which yields products having a broad molecular-weight distribution, good physical properties, good processibility and good purity.

Another object of the present invention is the development of a catalyst for the polymerization of an at least one α-olefin to give a polymerizate having a broad molecular-weight distribution consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, wherein said solid compound, prior to activation, is prepared by reacting a primary solid containing magnesium and halogen in two successive reacting stages A and B, in either order, where a solid based on magnesium compound(s) is reacted in reaction stage A with (i) at least one alkoxy compound of one or more elements of the I to VI groups of the Mendeleev Periodic Table, which contains at least one secondary or tertiary alkoxy group, and (ii) at least one halogen-containing metal compound of one or more elements of the IV and/or V sub-group(s) of the Mendeleev Periodic Table, and, in reaction stage B, a solid based on magnesium compound(s) is reacted with (i) at least one halogen-containing metal compound of one or more elements of the IV and/or V sub-group(s) of the Mendeleev Periodic Table and (ii) at least one organometallic compound where said metal is from the II and/or III main group(s) of the Mendeleev Periodic Table.

A further object of the present invention is the development of an improvement in the process for the polymerization of an at least one α-olefin comprising reacting said α-olefin under elevated temperatures and pressures in the presence of a solid polymerization catalyst consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen in two successive reacting stages A and B, in either order, where a solid based on magnesium compound(s) is reacted in reaction stage A with (i) at least one alkoxy compound of one or more elements of the I to VI groups of the Mendeleev Periodic Table, which contains at least one secondary or tertiary alkoxy group, and (ii) at least one halogen-containing metal compound of one or more elements of the IV and/or V sub-group(s) of the Mendeleev Periodic Table, and, in reaction stage B, a solid based on magnesium compound(s) is reacted with (i) at least one halogen-containing metal compound of one or more elements of the IV and/or V sub-group(s) of the Mendeleev Periodic Table and (ii) at least one organometallic compound where said metal is from the II and/or III main group(s) of the Mendeleev Periodic Table, whereby a polymerizate is recovered having a broad molecular-weight distribution.

These and other objects of the invention will become more apparent as the description thereof proceeds.

DESCRIPTION OF THE INVENTION

The above objects have been achieved by the present invention.

The subject of the invention is a process for the discontinuous or continuous polymerization of α-olefins, in the gaseous phase or in hydrocarbons as a dispersing media, at a pressure of from 2 to 40 bar, preferably up to approximately 15 bar, and at a temperature of from 60° to 100° C., optionally with the use of hydrogen as molecular-weight regulator, in the presence of a solid material as catalyst that contains elements of the IV and/or V sub-group(s) of the Mendeleev Periodic Table of Elements, magnesium, halogen, oxygen and, optionally, a (further) element of the II and/or III main group(s) of the Periodic Table and that is activated by organometallic compounds of metals of the II and/or III main group(s) of the Periodic Table, characterized in that the catalyst, which is subsequently still to be activated for use in the polymerization of α-olefins, is prepared by reacting a primary solid containing magnesium and halogen in two successive reaction stages A and B, wherein the solid based on magnesium compound(s) is treated, in reaction stage A, with alkoxy compound(s) of one or more of the element(s) of Groups I, II, III, IV, V and/or VI of the Periodic Table which contains at least one secondary or tertiary alkoxy group, and with halogen-containing metal compound(s) of one or more elements of the IV and V sub-group(s) of the Periodic Table and, in reaction stage B, is reacted with halogen-containing metal compounds of elements of the IV and/or V sub-group(s) and at least one organometallic compound of metals of the II and/or III main group(s) of the Periodic Table.

Compared to known catalysts of this type, the catalysts according to the invention give a polymerizate of an α-olefin, particularly ethylene, with a broad molecular-weight distribution, good physical properties, good processibility and good purity.

More particularly, the present invention relates to a catalyst for the polymerization of an at least one α-olefin to give a polymerizate having a broad molecular-weight distribution consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, wherein said solid compound, prior to activation, is prepared by reacting a primary solid containing magnesium and halogen in two successive reacting stages A and B, in either order, where a solid based on magnesium compound(s) is reacted in reaction stage A with (i) at least one alkoxy compound of one or more elements of the I to VI groups of the Mendeleev Periodic Table, which contains at least one secondary or tertiary alkoxy group, and (ii) at least one halogen-containing metal compound of one or more elements of the IV and/or V sub-group(s) of the Mendeleev Periodic Table, and, in reaction stage B, a solid based on magnesium compound(s) is reacted with (i) at least one halogen-containing metal compound of one or more elements of the IV and/or V sub-group(s) of the Mendeleev Periodic Table and (ii) at least one organometallic compound where said metal is from the II and/or III main group(s) of the Mendeleev Periodic Table; as well as the polymerizate produced employing the above catalyst.

The term a compound "containing an element" is understood to mean that the mentioned element is chemically bonded in the mentioned compound, and the term "Periodic Table" is understood to mean the Periodic Table according to Mendeleev (see "Handbook of Chemistry and Physics", 55th edition, inside cover).

All α-olefins that could previously be polymerized at pressures of from approximately 2 to 40 bar in the presence of solid catalysts of the so-called "Ziegler type" may be used as α-olefins that may be polymerized in accordance with the process of the invention. Ethylene, which is used alone or copolymerized in admixture with up to 10 mol% of α-alkenes having 3 to 6 carbon atoms, is preferred.

To prepare the catalyst used in the process according to the invention, a primary solid containing magnesium and halogen is used as starting material.

This primary solid may preferably be produced by reacting hydrocarbon-soluble magnesium compound(s) with a chlorohydrocarbon and/or carbon chloride compound(s) having in each case from 1 to 6 carbon atoms, of which at least one carries at least two directly bonded chlorine atoms.

Suitable hydrocarbon-soluble magnesium compounds, which may be used alone or in admixture, are especially organomagnesium compounds of the general formulae $R^1MgR^2$ and/or $R^1MgOR^2$, in which $R^1$ and $R^2$ are identical or different, straight-chain or branched alkyl radicals having from 2 to 20 carbon atoms or hydrocarbon aryl radicals having from 6 to 20 carbon atoms.

$R^1MgR^2$ compounds are especially preferred, for example, n-butyl-ethyl magnesium, di-n-butyl magnesium, n-butyl-isobutyl magnesium, n-butyl-sec-butyl magnesium, di-n-hexyl magnesium, di-n-pentyl magnesium, di-n-octyl magnesium, di-phenyl magnesium or mixtures of these compounds.

These organomagnesium compounds are especially preferably reacted with saturated chlorohydrocarbon and/or carbon chloride compounds, such as carbon tetrachloride, 1,1,1-trichloroethane, 1,1,2-trichloroethane, 1,1,2,2-tetrachloroethane, 1,1,1,2-tetrachloroethane, pentachloroethane, hexachloroethane or mixtures of these compounds. Chloroform is especially preferred, however.

The magnesium compound(s) and the organic chlorine compound, for example especially chloroform, are preferably reacted in quantities of from 0.5 to 10, and especially 1 to 4, mols of chlorine compound per mol of magnesium compound, preferably at temperatures of from −10° to 150° C., especially from 20° to 80° C., while stirring.

The duration of the reaction and the degree of dilution of the reactants is largely unimportant here. The reaction can be carried out within a few minutes or over several hours, for example, over a period ranging from 30 to 120 minutes. The degree of dilution can be varied within wide limits, for example, the organic chlorine compound such as the especially preferred chloroform, can be used in pure form or dissolved in hydrocarbons. The organomagnesium compound must be dissolved homogeneously in hydrocarbons, however, before commencing the reaction.

The reaction may be carried out in such a manner that the organic chlorine compound is added in portions to the dissolved magnesium compound, while stirring, or both reactants are metered simultaneously into the reaction container, while stirring. Preferably, however, the organic chlorine compound of the above-defined type, especially chloroform, is introduced in pure form or homogeneously dissolved in hydrocarbons, and the hydrocarbon solution of the organomagnesium compound(s) is added in portions, while stirring, because, in this manner, a catalyst solid especially well suited to the process of the invention can be produced.

The primary solid containing chlorine and magnesium and manufactured in the manner described can be further used directly, but preferably it is washed several times with hydrocarbons before further treatment.

A hydrocarbon or a mixture of hydrocarbons is then added to the primary solid so that a stirrable suspension is formed. The concentration is not critical but should be as concentrated as possible owing to the improved handling and the improved further reaction in the first reaction stage which then follows.

The order of the two successive reaction stages A and B is not critical for the success of the catalyst production or the polymerization process according to the invention. Thus, primary solid material prepared in the above-described manner may first be subjected to reaction stage A and, when this has finished, either reacted directly, or after an intermediate purification step, in reaction stage B. However, the reverse order of the reaction stages, preferably with an intermediate purification step, that is to say, reaction stage B before reaction stage A, is preferred.

The primary solid (or in the preferred embodiment of the preparation of the catalyst, the solid modified in reaction stage B) is reacted in reaction stage A with alkoxy compound(s) of one or more element(s) of group(s) I, II, III, IV, V and/or VI of the Periodic Table, preferably where the alkoxy has from 1 to 8 carbon atoms, at least one alkoxy being a secondary or tertiary alkoxy, and with halogen-containing metal compound(s) of one or more elements of the IV and/or V sub-group(s) of the Periodic Table.

In this process it is possible first to meter the mentioned metal compound(s) of the sub-group elements and then the alkoxy compound(s) into the (primary) solid or to meter in both components simultaneously to the magnesium-containing solid, but, preferably, the suspension of the (primary) solid is treated first with the alkoxy compound(s) and the at least one metal compound is added subsequently. Instead of treating the (primary) solid with prepared alkoxy compound(s), the alkoxy compound(s) may alternatively be produced in situ in the presence of the (primary) solid, for example, from aluminum trialkyl compound(s) and alcohol(s). Following this, the metal compound(s) of the sub-group element(s) is/are added.

Alternatively, of course, the suspension of the solid may be metered into the mentioned reactants (alkoxy compound and sub-group metal compound), but in that case preferably the one reactant does not come into contact with the other reactant before it has been combined with the primary solid or that modified in reaction stage B.

The reaction of the alkoxy compound(s) with the solid suspension is advantageously carried out at from −20° to 150° C., preferably at from 40° to 100° C., and the reaction of the at least one metal compound with the solid suspension is carried out advantageously at from −20° to 150° C., preferably at from 0° to 150° C., and especially at from 40° to 100° C.

If the halogen-containing metal compounds of metals of the IV and/or V sub-group(s) of the Periodic Table are liquid, they may be used in that state, but, preferably, and if they are not liquid, they are used in an as concentrated as possible solution in hydrocarbons.

The reaction times of this reaction stage A are not critical, and may range from a few minutes (for example 15 minutes) to several hours (for example 6 hours).

The at least one alkoxy compound is preferably used in an amount of from 0.01 to 1, especially from 0.1 to 0.5, mol per mol (gram atom) of magnesium contained in the solid, and the metal compound is preferably used in amounts of from 1 to 50, especially from 1 to 15, mols per mol of alkoxy compound(s). Of course, these ranges need not be adhered to, but the activity of the catalyst is influenced in particular by the amount of alkoxy compound(s), so that it is preferable not to deviate from the mentioned preferred range for the amount of alkoxy compound(s).

Suitable alkoxy compounds are compounds of the elements of main groups and/or sub-groups I, II, III, IV, V and VI of the Mendeleev Periodic Table, for example Li, Na, K, Rb, Cs, Be, Mg, Ca, Sr, Ba, Zn, Cd, B, Al, Ga, In, Tl, Sc, Y, La, Si, Ge, Sn, Ti, Zr, Hf, P, Sb, As, Bi, V, Nb, Ta, S, Se, preferably K, Na, Mg, Ca, Zn, B, Al, Si, Ti, Zr, P, V and S, which contain at least one alkoxy group that is derived from a secondary or tertiary alcohol. This alkoxy group preferably corresponds to one of the two formulae

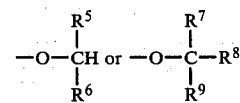

in which each of $R^5$, $R^6$, $R^7$, $R^8$ and $R^9$, independently of one another, represents a saturated straight-chain or branched alkyl group having from 1 to 8 carbon atoms, especially methyl, ethyl or propyl, or in which two of these radicals $R^5$ to $R^9$ together form an alkylene bridge having from 4 to 8 carbon atoms, that is to say, a secondary or tertiary, preferably saturated, cycloalkoxy radical optionally substituted by alkyl groups as hereinbefore defined, especially a cyclopentyloxy or cyclohexyloxy radical. If the alkoxy compounds contain several, for example 2 or 3, such alkoxy groups, these may be identical or different, but in most cases they are identical.

The valencies of the said elements that are not satisfied by the mentioned secondary and/or tertiary alkoxy groups may be satisfied by halogen atoms, for example fluorine or bromine, preferably chlorine, by hydroxy groups and/or by preferably only one (per atom of elements of groups II, III, IV, V and/or VI) primary alkoxy group of the formula $-O-R^{10}$, in which $R^{10}$ represents a saturated straight-chain or branched $C_1-C_9$ alkyl group, especially methyl, ethyl, propyl or butyl.

These preferred compounds (a) may be represented in most cases by the formulae

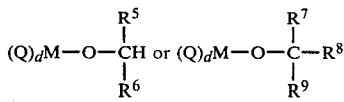

(5)

in which the radicals $R^5$ to $R^9$ have the meanings given above, M represents an element of main groups or subgroups I, II, III, IV, V and/or VI, and Q in each case represents a hydrogen atom, a halogen atom, a hydroxy group, a saturated straight-chain or branched alkyl group having from 1 to 8 carbon atoms or a primary, secondary or tertiary alkoxy group of the type defined hereinbefore. Although this is not expressed by the formulae, these compounds may obviously also be present in the form of dimers or oligomers. The index d may be 0 to 5, preferably 0 to 3, depending on the valency of the element of groups I to VI. If it is not 0 or 1, the radicals Q can be identical or different and each have one of the above-given meanings irrespective of the other bonded groups.

Suitable alkoxy compounds are also those that can be formed from the above-mentioned compounds (a) each having at least one hydroxy group (at least formal) by condensation with a water molecular being split off, for example, those of the formula (b)

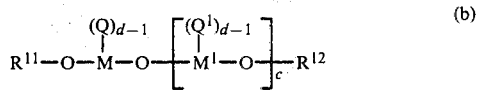

(b)

in which M and $M^1$, Q and $Q^1$, and $R^{11}$ and $R^{12}$ may in each case be identical or different, and M and $M^1$ have the meanings given above for M, and Q and $Q^1$ have the meanings given above for Q, and each of $-O-R^{11}$ and $-O-R^{12}$ represents a secondary or tertiary alkoxy group, as hereinbefore defined, and c is an integer of up to approximately 20 or higher, but preferably of up to 5, and is especially 1.

Also suitable are alkoxy compounds (c), which contain several of the elements of groups I to VI, especially of groups I to V, with at least one secondary or tertiary alkoxy group of the type hereinbefore defined.

The mentioned alkoxy compounds can be used individually or in the form of mixtures. Alkoxy compounds of this type that do not have an oxidizing effect on the reactants co-used in the manufacture of the catalyst solid and, in the case of alkoxy compounds of elements of main groups II and III, those that preferably do not contain any alkyl groups, are preferred.

A few examples of suitable alkoxy compounds are as follows:

type (a) lithium, sodium and potassium tert-butylate, sec-butylate and isopropylate; magnesium and zinc diisopropylate, di-sec-butylate, di-tert-butylate, ethyl isopropylate, ethyl tert-butylate, ethylate isopropylate, ethylate tert-butylate, ethyl sec-butylate and ethylate sec-butylate; triisopropyl borate, tri-sec-butyl borate, tricyclohexyl borate, tri-tert-butyl borate and tri-tert-pentyl borate; aluminum triisopropylate, aluminum tri-tert-butylate, aluminum tri-sec-butylate, aluminum tricyclohexanolate, aluminum tris(1-methylbutylate), aluminum tris(1-ethylpropylate; aluminum di-tert-butylate-ethylate, aluminum isopropylate-di-tert-butylate, aluminum diisopropylate-tert-pentylate, diisopropoxy-aluminum chloride, di-tert-butoxy-aluminum chloride, di-sec-butoxy-aluminum chloride and dihydroxyaluminum cyclohexanolate; silicon, germanium, tin, titanium, zirconium and hafnium tetraisopropylate, tetra-tert-butylate and tetra-sec-butylate; methoxy-triisopropoxysilane, methoxy-tri-tert-butoxysilane, methoxy-tri-sec-butoxysilane, dimethoxy-diisopropoxysilane, dimethoxy-di-tert-butoxysilane, diethoxy-di-tert-butoxysilane, isopropoxytri-tert-butoxysilane, triisopropoxysilane, tri-tert-butoxysilane, di-tert-butoxy-dichlorosilane, tri-tert-butoxy-chlorosilane, methyl-triisopropoxysilane, methyl-tri-sec-butoxysilane, tri-tert-butoxysilanol, and di-tert-butoxysilanediol; diisopropoxytitanium dichloride, triisopropoxyzirconium chloride, diisopropoxyzirconium dichloride, ethoxyzirconium tri-tert-butylate, dimethoxyzirconium di-tert-butylate, tert-butoxytin trichloride, tri-tert-butyl phosphate, triisopropyl phosphate, tri-sec-butyl phosphate, tri-tert-butyl vanadate, tri-sec-butyl vanadate, triisopropyl vanadate, diisopropyl sulfite, di-sec-butyl sulfite and di-tert-butyl sulfite;

type (b) isopropyl metaborate, sec-butyl metaborate, cyclohexyl metaborate, basic aluminum alcoholates of the empirical formula $Al_1(O\text{-isopropyl})_{2.1}O_{0.6}$ (cf. DE-OS 10 63 591); penta-tert-butoxy-chlorodisiloxane, hexa-tert butoxy-cyclotrisiloxane, octa-isopropoxy-trisiloxane, and hexaisopropyl dititanate;

| type (c) | $M^I[Al(O-i-C_3H_7)_4]$ | $M^I =$ | Li, Na, K, Rb, Cs; |
|---|---|---|---|
| | $M^{II}[Al(O-i-C_3H_7)_4]_2$ | $M^{II} =$ | Be, Mg, Ca, Sr, Ba, Zn; |
| | $M^{III}[Al(O-i-C_3H_7)_4]_3$ | $M^{III} =$ | Al, Ga, In, Sc, Y, La, Ce, Pr, Nd, Sm, Gd, Dy, Ho, Er, Yb; |
| | U, Th[Al(O—i-C_3H_7)_4]_4, | | |
| | Zr(O—i-C_3H_7)_4.2 Al(O—i-C_3H_7)_3, | | |
| | Zr(O—i-C_3H_7)_4.Al(O—i-C_3H_7)_3, | | |
| | Nb, Ta(O—i-C_3H_7)_5.Al(O—i-C_3H_7)_3, | | |
| | Nb, Ta(O—i-C_3H_7)_5.2 Al(O—i-C_3H_7)_3, | | |
| | 3 Zn(O—i-C_3H_7)_2.Al(O—i-C_3H_7)_3 | | |

Of these alkoxy compounds, the boric acid esters, the aluminum alcoholates and the silicates are especially preferred.

Halogen-containing metal compounds of elements of the IV and V sub-groups of the Periodic Table are here preferably compounds of titanium, zirconium and vanadium, titanium compounds being especially preferred.

In reaction stage A of the catalyst production, compounds of the general formula

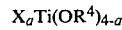

$X_a Ti(OR^4)_{4-a}$ and, in reaction stage B described in detail hereinafter, compounds of the general formula

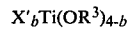

$X'_b Ti(OR^3)_{4-b}$ have proved especially suitable. In these formulae, each of X and X', independently of one another, represents halogen, especially chlorine, each of $R^3$ and $R^4$, independently of one another, represents identical or different, straight-chain or branched alkyl radicals having from 1 to 8 carbon atoms and/or hydrocarbon aryl radicals having from 6 to 8 carbon atoms, and each of a and b, independently of one another, represents 2, 3 or 4, preferably 4. The compounds may be used in pure form in each case, or as mixtures. Titanium tetrachloride is especially preferred in each case.

If reaction stage A is carried out as the first reaction stage in the preparation of the catalyst for the process according to the invention, the solid thus modified is then preferably freed from soluble metal compounds, especially titanium compounds at temperatures of from 0° to 100° C., especially from 20° to 100° C., by repeated washing with hydrocarbons, by allowing to settle and decanting.

Preferably, the solid is then, in its turn, like the primary solid prior to the first reaction stage, suspended in hydrocarbons. The remarks referring to the concentration again apply here. The process is carried out in an analogous manner when reaction stage B, described hereinafter, is carried out as the first reaction stage of the catalyst manufacture.

The solid modified in reaction stage A, or, in the preferred manner of operation in which reaction stage A is carried out after reaction stage B, the primary solid, is reacted in reaction stage B with at least one halogen-containing compound of at least one element of the IV and/or V sub-group(s) of the Periodic Table, as define hereinbefore, and with at least one organometallic compound of a metal of the II and/or III main group(s) of the Periodic Table.

The reaction is preferably carried out at temperatures of from −40° to 100° C., especially from −5° to 70° C., wherein preferably from 0.01 to 5, especially from 0.1 to 1, mol of the said metal compound of the sub-group elements, especially titanium tetrachloride, is used per mol of magnesium bonded in the solid, and preferably from 0.3 to 5, especially from 0.5 to 2.5, mols of the said organometallic compound of a metal of the main group elements are used per mol of the said metal compound of the sub-group of elements.

One mol of a mixture of substances means that amount of the mixture which theoretically (conversion = 100% of the theoretical value) reacts with the same amount of a reactant as would one mol of a pure substance that is contained in this mixture of substances.

The elements of the II and III main groups of the Periodic Table are understood here to mean, in particular, beryllium, magnesium, boron, and aluminum, preferably magnesium and especially aluminum.

The organometallic compounds of these elements are understood to mean those that contain the metal atoms bonded to alkyl radicals having from 1 to 20 carbon atoms and/or hydrocarbon aryl radicals having from 6 to 20 carbon atoms. Valencies of the metals not bonded to these said radicals may, furthermore, be satisfied by hydrogen and/or by halogen, preferably chlorine, and also by alkoxy and/or siloxy radicals, each having from 1 to 20 carbon atoms and/or hydrocarbon aryloxy radicals having from 6 to 20 carbon atoms. Furthermore, oligomeric alkyl aluminum compounds may be used, that is to say, compounds which, in addition to the above-mentioned substituents, also contain aluminum-oxygen-aluminum bonds. Compounds of the formula $AlR^{13}{}_zY_{3-z}$ described in detail hereinafter are preferred. Examples of preferred compounds of this kind are the following: triethyl aluminum, tri-n-butyl aluminum, triisobutyl aluminum, tri-n-octyl aluminum, "isoprenyl" aluminum, diethyl aluminum hydride, diisobutyl aluminum hydride, ethyl aluminum dichloride, diethyl aluminum chloride, ethyl aluminum sesquichloride, diethylethoxy aluminum, (ethyldimethylsiloxy)-diethyl aluminum, bis(diisopropyl aluminum) oxide, and mixtures thereof.

In the above-described reaction stage B, diethyl aluminum chloride, ethyl aluminum sesquichloride, "isoprenyl" aluminum, tri-n-octyl aluminum or mixtures of these compounds are especially preferred.

The reaction time of reaction stage B may vary from a few minutes (for example, 15 minutes) to several hours (for example, 2 hours) and is not critical.

Reaction stage B can be carried out in such a manner that first of all the main-group compounds, preferably dissolved in a hydrocarbon, for example, those of the above-mentioned aluminum compounds, and the primary solid, preferably suspended in hydrocarbons, or the solid modified in stage A, are combined, and thereafter the sub-group compounds, likewise preferably dissolved in hydrocarbons, for example, the preferred titanium tetrachloride, are metered in. Simultaneous addition of the components is also possible. Preferably, however, the sub-group compound, for example, the preferred titanium tetrachloride, and the solid, both preferably dissolved or suspended respectively in hydrocarbons, are introduced and the main-group compounds, preferably the organyl aluminum compounds, are then added thereto.

Preferably, after modification in the two reaction stages A and B, at temperatures of from 0° to 100° C., the solid catalyst is substantially freed from soluble compounds by repeated washing with hydrocarbons, by allowing to settle and decanting.

Additionally or alternatively, it may be advantageous, especially when reaction stage B is carried out before reaction stage A as is especially preferred, to subject the solid catalyst after the second reaction stage to a subsequent treatment.

This subsequent treatment is carried out by reacting a stirrable suspension of the catalyst solid in hydrocarbons with one or more organyl metal compounds, preferably likewise dissolved in hydrocarbons, of the II and/or III sub-group(s) of the Periodic Table, as already defined hereinbefore. Of the preferred organyl aluminum compounds, in particular, diethyl aluminum chloride, ethyl aluminum sesquichloride, "isoprenyl" aluminum, tri-n-octyl aluminum and mixtures thereof, are preferred.

This additional subsequent treatment of the catalyst solid is preferably carried out at temperatures of from −40° to 150° C., especially from −20° to 100° C. with the use of preferably from 0.01 to 5 mols, especially from 0.1 to 1 mol, of the organyl metal compound(s) per mol of magnesium bonded in the solid.

The remarks made initially referring to the concentration of the solid suspension apply equally to all stages of the catalyst production. The reaction time of the subsequent treatment may likewise range from a few minutes to several hours (for example, 15 minutes to 2 hours).

A further advantageous possibility for the subsequent treatment, whether reaction stage A is carried out before or after reaction stage B, consists of ageing the solid in suspension for several hours, for example, for 2 to 8 hours, at temperatures of from 50° to 100° C., and then washing it.

The preparation of the catalyst solid and the execution of the polymerization according to the invention must be carried out with the exclusion of even small quantities of oxygen and water or water vapor.

The catalyst solid prepared in the above-described manner which has been freed, especially from soluble metal compounds, preferably by washing with hydrocarbons, preferably at temperatures of from 0° to 100° C., allowing to settle and decanting, is suitable for use in the polymerization according to the invention of those α-olefins which it was previously possible to polymerize in the presence of catalysts of the "Ziegler" type at pressures ranging from approximately 2 to 40 bar in the gaseous phase or in dispersion. In a preferred embodiment of the process according to the invention, ethylene in admixture with from 0 to 10 mol% of α-olefins, especially α-alkenes, having from 3 to 6 carbon atoms, for example, propene, but-1-ene, isobutene, pent-1-ene and hex-1-ene, is used and (co)polymerized.

Especially good results are obtained when ethylene is homopolymerized.

The polymerization initiated with the above-described catalyst system can be carried out in the gaseous phase or in suspension. In the preferred polymerization in suspension, the reactants, preferably dispersed in a hydrocarbon or a hydrocarbon mixture, are polymerized at pressures of from 2 to 40 bar (absolute), preferably from 2 to 11 bar, and at temperatures of from 60° to 100° C. In that operation, the chain length of the resulting polymerizates can be regulated optionally by the addition of hydrogen, or, in other words, the polymerization degree of the products can be regulated.

The hydrocarbons employed are understood in the scope of this application to be saturated compounds that are composed of the elements carbon and hydrogen, such as straight-chain, branched and cyclic alkanes or paraffin hydrocarbons which are predominantly liquid at the stated temperatures and pressures, for example, alkanes having from 3 to 20 carbon atoms. Examples are propane, the butanes, the pentanes, the hexanes, the heptanes, the octanes, the nonanes, the decanes, decalin, cyclohexane and mixtures thereof.

To initiate the polymerization, the catalyst solid is activated by the addition of organyl metal compound(s) of metals of the II and/or III main group(s) of the Periodic Table.

Of the above already defined compounds of this kind, aluminum organic compounds of the general formula $AlR^{13}{}_zY_{3-z}$ or mixtures thereof are preferred, wherein $R^{13}$ represents identical or different, straight-chain or branched alkyl radicals having from 1 to 20 carbon atoms and/or hydrocarbon aryl radicals having from 6 to 20 carbon atoms, Y represents hydrogen and/or identical or different halogen atoms, alkoxy radicals, and/or siloxy radicals, each having from 1 to 20 carbon atoms and/or hydrocarbon aryloxy radicals having from 6 to 20 carbon atoms, and z is 2 or 3. Especially preferred are triisobutyl aluminum, tri-n-octyl aluminum and "isoprenyl" aluminum and mixtures thereof.

The oligomeric organyl aluminum compounds already described in the description of reaction stage B may also be used here.

The organyl metal compound of metals of the II and/or III main group(s) of the Periodic Table are preferably used in excess compared with the sub-group elements of the IV and V main groups bonded in the solid catalyst. It is, of course, also possible to use a deficiency or stoichiometric amounts. In a preferred embodiment, for example, from 2 to 100, especially from 5 to 50, mols of at least one aluminum compound is used per mol of titanium contained and chemically bonded in the catalyst solid.

The polymerization process according to the invention can be carried out continuously or discontinuously. In the discontinuous method, catalyst solid manufactured in the above-described manner, activator, α-olefin, optionally at least one hydrocarbon and optionally hydrogen are introduced into the reactor, preferably an autoclave, and the polymerization is then carried out. Of course, individual components or all of the components may be metered in subsequently, as a whole or partially.

In the continuous method, the said reactants are fed into the reactor continuously, separately or as a mixture, in the desired composition. Here, too, subsequent metering-in of partial amounts of individual components or all of the components is possible, and when using, for example, tube reactors, also metering in at different points of the reactor can be followed.

By the process according to the invention, polymerizates may be obtained which need not be subjected to any further treatment. This is achieved because of the small amount of catalyst system required as a result of its surprisingly high activity which does not have any marked detrimental effect on the product. A further advantage of the catalyst system is the manufacture of polymerizates having excellent power properties, a broad distribution of molecular weight, very good physical properties and good processibility. For example, the polymerizates manufactured according to the invention can be shaped by blow-extrusion "free of melt fractures", for example to form hollow articles or sheet materials. Of the very good physical properties, only the high rigidity, the impact strength and the good stress crack resistance are mentioned.

The invention is explained in detail hereinafter by Examples and Comparison Examples. These are not to be deemed limitative, however,

EXAMPLES

The melt index $MFI_5$ mentioned in the Examples is determined in accordance with DIN (Deutsche Industrie Norm (German Industrial Standard) 53 735 at 190° and 49.03 N (5 kp) stress.

The flow factor $F_{21.6}$ is the quotient of the melt indices at 211.82 N (21.6 kp) and 49.03 N (5 kp) stress and can be employed as a measure of the molecular weight distribution.

The catalyst which is used in the polymerization according to the invention can be manufactured, for example, in the following manners:

(a) Manufacture of the primary solid 900 ml of a hexane/heptane solution which contained 0.5 mol of n-butyl-sec-butyl magnesium, were metered in, over a period of 2 hours, at 60° C. into 1 mol of chloroform in 420 ml of isooctane. A brown solid formed. The mixture was stirred for approximately half-an-hour at 60° C. and then the solid was washed at 50° to 60° C. three times with 3 liters of isooctane each time, with repeated settling and decanting. The mixture was then brought to 1 liter.

(b) Manufacture of the catalyst solid b 1—Reaction A followed by Reaction B 100 ml of the primary solid suspension manufactured according to (a), which contained 50 mmols of magnesium, were introduced into the reaction container and 15 mmols of aluminum triisopropylate were added, while stirring, at room temperature. After stirring for one hour at 50° C., 100 mmols of $TiCl_4$ were added to the suspension. The mixture was heated to 80° C. and stirred for a further 2 hours at 80° C. The mixture was then cooled to 50° C. and the solid washed with isooctane by repeated settling and decanting until almost no dissolved titanium could be detected in the decanted liquid.

18.7 mmols of titanium were fixed on the solid.

The solid was suspended in 100 ml of isooctane, and 15 mmols of $TiCl_4$ were added thereto at room temperature. Then, while stirring, 30 mmols of ethyl aluminum sesquichloride, dissolved in 15 ml of isooctane, were added within a few minutes. After heating to 50° C., the mixture was stirred for 1 hour at 50° C., and then, with repeated settling and decanting, washed with isooctane at 50° C., until almost no dissolved chloride or dissolved aluminum could be detected in the decanted isooctane.

A total of 34 mmols of titanium were fixed on the catalyst solid.

(b2) The manufacture was carried out as described in (b1), except that, after the second wash, the catalyst solid was suspended in 300 ml of isooctane for the subsequent treatment and aged for 3 hours at 90° C. After repeated washing at 50° C. with isooctane, the catalyst solid contained a total of 31 mmols of bonded titanium.

(b3) The catalyst was produced as described in (b1) except that, in the second stage (reaction stage B), 15 mmols of ethylaluminum sesquichloride were used instead of 30 mmols.

The catalyst solid contained a total of 33.2 mmols of bonded titanium.

(b4) The manufacture was carried out as described in (b3) except that the catalyst solid was subsequently treated analogously to (b2). The catalyst solid contained a total of 30.4 mmols of bonded titanium.

(b5) 100 ml of the primary solid suspension produced according to (a), which contained 50 mmols of magnesium, were introduced into the reaction vessel and 15 mmols of triisopropyl borate were added at room temperature, while stirring. After heating to 50° C., the suspension was stirred for 1 hour. 33 mmols of $TiCl_4$ were then added. The suspension was then heated to 90° C. and stirred for a further 3 hours. After cooling to 50° C., the solid was washed at 50° C. analogously to (b1).

The solid contained 17.5 mmols of bonded titanium.

After taking up in 130 ml of isooctane, 15 mols of $TiCl_4$, and then 30 mmols of ethyl aluminum sesquichloride dissolved in 15 ml of isooctane, were added at room temperature, while stirring. The suspension was then stirred for 1 hour at 50° C. and washed analogously to (b1).

The catalyst solid contained a total of 31.3 mmols of bonded titanium.

(b6) 100 ml of the primary solid suspension produced according to (a), which contained 50 mmols of magnesium, were introduced into the reaction vessel and 11 mmols of tri-tert-butyl borate were added at room temperature, while stirring. After heating to 50° C., the suspension was stirred for 1 hour. 100 mmols of $TiCl_4$ were then added. The suspension was then heated to 90° C. and stirred for ½ hour.

After cooling to 50° C., the solid was washed analogously to (b1).

The solid contained 12 mmols of bonded titanium.

After taking up in 100 ml of isooctane, 15 mmols of $TiCl_4$, and then 15 mmols of ethyl aluminum sesquichloride dissolved in 7.5 ml of isooctane, were added at room temperature, while stirring. The suspension was then stirred for one hour at 50° C. and washed analogously to (b1).

The catalyst solid contained a total of 28.9 mmols of bonded titanium.

b7—Reaction B followed by Reaction A 100 ml of the primary solid suspension produced according to (a), which contained 50 mmols of magnesium, were introduced into the reaction vessel and 15 mmols of $TiCl_4$ and 30 mmols of ethyl aluminum sesquichloride, dissolved in 15 ml of isooctane, were added at room temperature, while stirring. After heating to 50° C., the mixture was stirred for 1.5 hours, and washed with isooctane at that temperature with repeated sedimentation and decanting until practically no aluminum or chloride could be detected in the decanted liquid.

The solid contained 14.6 mmols of bonded titanium.

After taking up in 100 ml of isooctane, 15 mmols of aluminum triisopropylate were added at room temperature, while stirring. The suspension was then stirred for 1 hour at 50° C. After adding 30 mmols of $TiCl_4$, the suspension was heated to 90° C. and stirred for a further half-hour. After cooling to 50° C., washing was again carried out until practically no dissolved titanium could be detected in the decanted isooctane.

The solid was suspended again in 300 ml of isooctane for the subsequent treatment, and aged for 3 hours at 90° C. After repeated washing at 50° C. with isooctane, the catalyst solid contained a total of 28.8 mmols of bonded titanium.

(b8) The catalyst solid was produced as described in (b7), except that the solid was suspended in 100 ml of isooctane for the subsequent treatment, 2 ml of ethyl aluminum sesquichloride were added and the suspension was stirred for one hour at 50° C. and washed again at that temperature.

The catalyst solid contained a total of 27.9 mmols of bonded titanium.

(b9) The catalyst solid was produced as described in (b7), except that the solid was suspended in 100 ml of isooctane for the subsequent treatment, 1.6 ml of "isoprenyl" aluminum were added and the suspension was stirred for 1 hour at 50° C. and washed again at that temperature. The catalyst solid contained a total of 27.5 mmols of bonded titanium.

(b10)—Reaction B followed by Reaction A 100 ml of the primary solid suspension produced according to (a), which contained 50 mmols of magnesium, were introduced into the reaction vessel, and 15 mmols of titanium tetrachloride and 30 mmols of ethyl aluminum sesquichloride, dissolved in 15 ml of isooctane, were added at room temperature, while stirring. After heating to 50° C., the suspension was stirred for 1.5 hours and washed with isooctane at that temperature, with repeated sedimentation and decanting, until practically no aluminum or chloride could be detected in the decanted liquid.

The solid contained 14.3 mmols of bonded titanium.

After taking up in 100 ml of isooctane, 15 mmols of triethylaluminum, dissolved in 20 ml of isooctane, and 45 mmols of isopropanol, dissolved in 20 ml of isoctane, were simultaneously metered into the suspension over a period of a quarter-hour at room temperature, while stirring. After stirring for 1 hour at 50° C., 30 mmols of titanium tetrachloride were added. The suspension was then heated to 90° C. and stirred for half-an-hour. Further treatment was as described in (b7).

The solid contained a total of 27.6 mmols of bonded titanium.

(b11) The manufacture was carried out as described in (b10), except that the solid was suspended in 100 ml of isooctane for the subsequent treatment, 1 ml of ethyl aluminum sesquichloride was added and the suspension was stirred for 1 hour at 50° C. and washed again at that temperature.

The solid contained a total of 27.2 mmols of bonded titanium.

(b12) 100 ml of the primary solid suspension produced according to (a), which contained 50 mmols of magnesium, were introduced into the reaction vessel, and 15 mmols of titanium tetrachloride and 30 mmols of ethyl aluminum sesquichloride, dissolved in 15 ml of isooctane, were added at room temperature, while stirring. After heating to 50° C., the suspension was stirred for 1.5 hours and then washed with isooctane at that temperature, with repeated sedimentation and decanting, until practically no aluminum or chloride could be detected in the decanted liquid.

The solid contained 14.6 mmols of bonded titanium.

After taking up in 100 ml of isooctane, 15 mmols of triethylaluminum, dissolved in 20 ml of isooctane, and a mixture of 30 mmols of isopropanol and 15 mmols of tertbutanol, dissolved in 20 ml of isooctane, were metered into the suspension over a period of 15 minutes, at room temperature, while stirring. After stirring for 1 hour at 50° C., 30 mmols of TiCl$_4$ were added. The suspension was then heated to 90° C. and stirred for half-an-hour.

Further treatment was as described in (b7).

The solid contained a total of 29 mmols of bonded titanium.

(b13) The manufacture was carried out as described in (b12), exept that the solid was subsequently treated as described in (b11).

The catalyst solid contained a total of 28 mmols of bonded titanium.

(b14) 100 ml of the primary solid suspension produced according to (a), which contained 50 mmols of magnesium, were introduced into the reaction vessel, and 15 mmols of TiCl$_4$ and 30 mmols of ethyl aluminum sesquichloride, dissolved in 15 ml of isooctane, were added at room temperature, while stirring. After heating to 50° C., the suspension was stirred for 90 minutes and washed with isooctane at that temperature, with repeated sedimentation and decanting, until practically no aluminum or chloride could be detected in the decanted liquid.

The solid contained 14.4 mmols of bonded titanium.

After taking up in 100 ml of isooctane, 15 mmols of triisopropyl borate were added at room temperature, while stirring. The suspension was then stirred at 50° C. for 1 hour. After adding 30 mmols of TiCl$_4$, the suspension was heated to 95° C. and stirred for a further hour. After cooling to 50° C., washing was again carried out until practically no dissolved titanium could be detected in the decanted isooctane.

The solid was again suspended in 300 ml of isooctane for the subsequent treatment, and aged for 3 hours at 90° C. After repeated washing at 50° C. with isooctane, the catalyst solid contained a total of 25 mmols of bonded titanium.

(b15) The catalyst solid was produced as described in (b14), except that, instead of the ageing process, the solid was suspended in 100 ml of isooctane for the subsequent treatment, 2 ml of ethyl aluminum sesquichloride were added and the suspension was stirred for 1 hour at 50° C. and washed again at that temperature.

The catalyst solid contained a total of 22.5 mmols of bonded titanium.

(b16) 100 ml of the primary solid suspension produced according to (a), which contained 50 mmols of magnesium, were introduced into the reaction vessel, and 15 mmols of TiCl$_4$ and 30 mmols of ethyl aluminum sesquichloride, dissolved in 15 ml of isooctane, were added at room temperature, while stirring. After heating to 50° C., the suspension was stirred for 1.5 hours and washed with isooctane at that temperature with repeated sedimentation and decanting until practically no aluminum or chloride could be detected in the decanted liquid.

The solid contained 14.7 mmols of bonded titanium.

After taking up in 100 ml of isooctane, 7.5 mmols of tri-tert-butyl phosphate were added at room temperature, while stirring. The suspension was then stirred for 1 hour at 50° C. After adding 30 mmols of TiCl$_4$ the suspension was heated to 90° C. and stirred for a further ½ hour. After cooling to 50° C., washing was again carried out until practically no dissolved titanium could be detected in the isooctane.

For the subsequent treatment, the solid was again suspended in 300 ml of isooctane and aged for 3 hours at 90° C. while stirring. After repeated washing at 50° C. with isooctane, the catalyst solid contained a total of 19.6 mmols of bonded titanium.

(b17) The catalyst was prepared as described in (b16), except that 15 mols of tri-tert-butyl phosphate were used instead of 7.5 mmols.

For the subsequent treatment the solid was suspended in 300 ml of isooctane, 2 ml of ethyl aluminum sesquichloride were added and the suspension was stirred for 1 hour at 50° C. and washed again at that temperature.

The catalyst solid contained 24 mmols of bonded titanium.

(b18) 100 ml of the primary solid suspension produced according to (a), which contained 50 mmols of magnesium, were introduced into the reaction vessel and 15 mmols of TiCl$_4$ and 30 mmols of ethyl aluminum sesquichloride, dissolved in 15 ml of isooctane, were added at room temperature, while stirring. After heating to 50° C., the suspension was stirred for 1.5 hours and washed with isooctane at that temperature, with repeated sedimentation and decanting, until practically no aluminum or chloride could be detected in the decanted liquid.

The solid contained 14.4 mmols of bonded titanium.

After taking up in 100 ml of isooctane, 15 mmols of tri-tert-butyl vanadate were added at room temperature, while stirring. The suspension was then stirred for 1 hour at 50° C. After adding 30 mmols of TiCl$_4$, the suspension was heated to 90° C. and stirred for a further ½ hour. After cooling to 50° C., the suspension was washed again until practically no dissolved titanium could be detected in the decanted isooctane.

The catalyst solid contained a total of 30.6 mmols of bonded titanium and 14.8 mmols of bonded vanadium.

(b19) The catalyst was prepared as described in (b16), except that, instead of 15 mmols of tri-tert-butyl vanadate, 15 mmols of triisopropyl vanadate were used. The suspension was then stirred for 1 hour at 50° C. After adding 30 mmols of TiCl$_4$, the suspension was heated to 90° C. and stirred for 3 hours.

After washing, the catalyst solid contained 32 mmols of bonded titanium and 15 mmols of bonded vanadium.

(b20) Reaction A followed by Reaction B 100 ml of the primary solid suspension produced according to (a), which contained 50 mmols of magnesium, were introduced into the reaction vessel and 7.5 mmols of triisopropyl vanadate were added at room temperature, while stirring. After heating to 50° C., the suspension was stirred for 1 hour. 30 mmols of TiCl$_4$ were then added. The suspension was then heated to 90° C. and stirred for a further 3 hours. After cooling to 50° C., the solid was washed with isooctane, with repeated sedimentation and decanting, until practically no titanium could be detected in the decanted liquid.

The solid contained 17.5 mmols of bonded titanium and 7.4 mmols of bonded vanadium.

After taking up in 100 ml of isooctane, 15 mmols of TiCl$_4$, and then 30 mmols of ethyl aluminum sesquichloride dissolved in 15 ml of isooctane, were added at room temperature, while stirring. After heating to 50° C., the suspension was stirred for 1 hour and then washed until practically no aluminum or chloride could be detected in the decanted isooctane.

The catalyst solid contained a total of 32 mmols of bonded titanium and 6.8 mmols of bonded vanadium.

(b21) 100 ml of the primary solid suspension produced according to (a), which contained 50 mmols of magnesium, were introduced into the reaction vessel and 15 mmols of diisopropyl sulfite were added at room temperature, while stirring. After heating to 50° C., the suspension was stirred for 1 hour. 100 mmols of TiCl$_4$ were then added. The suspension was then heated to 90° C. and stirred for a further 1.5 hours. After cooling to 50° C., the solid was washed with isooctane, with repeated sedimentation and decanting, until practically no titanium could be detected in the decanted liquid.

The solid contained 9.5 mmols of bonded titanium.

After taking up in 100 ml of isooctane, 15 mmols of TiCl$_4$, and then 30 mmols of ethyl aluminum sesquichloride dissolved in 15 ml of isooctane, were added at room temperature, while stirring. After heating to 50° C., the suspension was stirred for 1 hour and then washed until practically no aluminum or chloride could be detected in the decanted isooctane.

The catalyst solid contained a total of 24.8 mmols of bonded titanium.

(b22) Reaction B followed by Reaction A 100 ml of the primary solid suspension produced according to (a), which contained 50 mmols of magnesium, were introduced into the reaction vessel, and 15 mmols of TiCl$_4$ and 30 mmols of ethyl aluminum sesquichloride, dissolved in 15 ml of isooctane, were added at room temperature, while stirring. After heating to 50° C., the suspension was stirred for 1 hour and washed with isooctane at that temperature, with repeated sedimentation and decanting, until practically no aluminum or chloride could be detected in the decanted liquid.

The solid contained 14.4 mmols of bonded titanium.

After taking up in 150 ml of isooctane, 7.5 mmols of ZnEt$_2$, and then 15 mmols of tert-butanol dissolved in 10 ml of isooctane, were added at room temperature, while stirring. The suspension was then stirred for 1 hour at 50° C. After adding 100 mmols of TiCl$_4$, the suspension was heated to 90° C. and stirred for a further ½ hour. After cooling to 50° C., washing was carried out again until practically no dissolved titanium could be detected in the decanted isooctane.

For the subsequent treatment, the solid was suspended again in 300 ml of isooctane and aged for 3 hours at 90° C., while stirring. After repeated washing at 50° C. with isooctane, the catalyst solid contained a total of 27 mmols of bonded titanium.

(b23) The catalyst was prepared as described in (b22) except that, in the second stage, 30 mmols of TiCl$_4$ were used, instead of 100 mmols.

The catalyst solid contained a total of 22 mmols of bonded titanium.

(b24) The catalyst was prepared as described in (b22), except that, in the second stage, 15 mmols of ZnEt$_2$ were used, instead of 7.5 mmols, and 30 mmols of tert-butanol were used, instead of 15 mmols. The catalyst solid contained a total of 28.8 mmols of bonded titanium.

(b25) The catalyst was prepared as described in (b22), except that, in the second stage, 15 mmols of isopropanol were added, instead of tert-butanol. The reaction with TiCl$_4$ was carried out for 2 hours at 90° C.

The catalyst solid contained a total of 27.3 mmols of bonded titanium.

(b26) Reaction A followed by Reaction B 100 ml of the primary solid suspension produced according to (a), which contained 50 mmols of magnesium, were introduced into the reaction vessel and 15 mmols of tertbutanol, dissolved in 10 ml of isooctane, were added at room temperature, while stirring. The suspension was stirred for ¼ hour, 7.5 mmols of ZnEt$_2$ dissolved in 10 ml of isooctane were added, and the suspension was stirred for 1 hour at 50° C.

100 mmols of TiCl$_4$ were then added. The suspension was then heated to 80° C. and stirred for a further hour at that temperature. After cooling to 50° C., the solid was washed with isooctane, with repeated sedimentation and decanting, until practically no titanium could be detected in the decanted liquid.

The solid contained 13.1 mmols of bonded titanium.

After taking up in 150 ml of isooctane, 15 mmols of TiCl$_4$, and then 30 mmols of ethyl aluminum sesquichloride dissolved in 15 ml of isooctane, were added at room temperature, while stirring. After heating to 50° C., the suspension was stirred for one hour and then washed until practically no aluminum or chloride could be detected in the decanted isooctane.

The catalyst solid contained a total of 26.2 mmols of bonded titanium.

(b27) Reaction B followed by Reaction A 100 ml of the primary solid suspension produced according to (a), which contained 50 mmols of magnesium, were introduced into the reaction vessel and 15 mmols of TiCl$_4$ and 30 mmols of ethyl aluminum sesquichloride, dissolved in 15 ml of isooctane, were added at room temperature while stirring. After heating to 50° C., the suspension was stirred for 1.5 hours and washed with isooctane at that temperature, with repeated sedimentation and decanting, until practically no aluminum or chloride could be detected in the decanted liquid.

The solid contained 14.7 mmols of bonded titanium.

After taking up in 100 ml of isooctane, 20 mmols of potassium tert-butylate were added at room temperature, while stirring. The suspension was then stirred for 1 hour at 50° C. After adding 40 mmols of TiCl$_4$, the suspension was heated to 90° C. and stirred for a further ½ hour. After cooling to 50° C., washing was carried out again until practically no dissolved titanium could be detected in the decanted isooctane.

The catalyst solid contained a total of 28.2 mmols of bonded titanium.

(b28) The catalyst was prepared as described in (b27), except that the potassium tert-butylate was replaced by sodium isopropylate.

The catalyst solid contained a total of 24 mmols of bonded titanium.

(b29) 100 ml of the primary solid suspension produced according to (a), which contained 50 mmols of magnesium, were introduced into the reaction vessel and 15 mmols of $TiCl_4$ and 30 mmols of ethyl aluminum sesquichloride, dissolved in 15 ml of isooctane, were added at room temperature, while stirring. After heating to 50° C., the suspension was stirred for 1.5 hours, and washed with isooctane at that temperature, with repeated sedimentation and decanting, until practically no aluminum or chloride could be detected in the decanted liquid.

The solid contained 14.7 mmols of bonded titanium.

After taking up in 100 ml of isooctane, 15 mmols of tetraisopropoxysilane were added at room temperature, while stirring. The suspension was then stirred for 1 hour at 50° C. After adding 40 mmols of $TiCl_4$, the suspension was heated to 95° C. and stirred for a further hour. After cooling to 50° C., washing was carried out again until practically no dissolved titanium could be detected in the decanted isooctane.

The catalyst solid contained a total of 38 mmols of bonded titanium.

(b30) The catalyst was prepared as described in (b29), except that, for the subsequent treatment, the solid was suspended again in 300 ml of isooctane and aged for 3 hours at 90° C., while stirring. After repeated washing at 50° C. with isooctane, the catalyst solid contained a total of 36 mmols of bonded titanium.

(b31) Reaction A followed by Reaction B 100 ml of the primary solid suspension produced according to (a), which contained 50 mmols of magnesium, were introduced into the reaction vessel and 15 mmols of tetraisopropoxysilane were added at room temperature, while stirring. After heating to 50° C., the suspension was stirred for 1 hour. 50 mmols of $TiCl_4$ were then added. The suspension was then heated to 90° C. and stirred for a further 6 hours. After cooling to 50° C., the solid was washed with isooctane, with repeated sedimentation and decanting, until practically no titanium could be detected in the decanted liquid.

The solid contained 12.8 mmols of bonded titanium.

After taking up in 100 ml of isooctane, 15 mmols of $TiCl_4$, and then 30 mmols of ethyl aluminum sesquichloride dissolved in 15 ml of isooctane, were added at room temperature, while stirring. After heating to 50° C., the suspension was stirred for 1 hour and then washed until practically no aluminum or chloride could be detected in the decanted isooctane.

The catalyst solid contained a total of 27.5 mmols of bonded titanium.

(b32) The catalyst was prepared as described in (b31), but the solid was subsequently treated analogously to (b30). The catalyst solid contained a total of 26 mmols of bonded titanium.

(b33) Reaction B followed by Reaction A

The first stage of the catalyst preparation was carried out as described in (b29).

After taking up in 100 ml of isooctane, 10 mmols of tri-tert-butoxychlorosilane were added at room temperature, while stirring. The suspension was then stirred for 1 hour at 50° C. After adding 50 mmols of $TiCl_4$, the suspension was heated to 90° C. and stirred for a further ½ hour. After cooling to 50° C., the solid was washed analogously to (b29) and subsequently treated as in (b30).

The catalyst solid contained a total of 19.4 mmols of bonded titanium.

(b34) The first stage of the catalyst preparation was carried out as described in (b29).

After taking up in 100 ml of isooctane, 15 mmols of tri-tert-butoxysilane were added at room temperature, while stirring. The suspension was then stirred for 1 hour at 50° C. After adding 30 mmols of $TiCl_4$, the suspension was heated to 90° C. and stirred for a further ½ hour. After cooling to 50° C., the solid was washed analogously to (b29) and subsequently treated as in (b30). The catalyst solid contained a total of 24.6 mmols of bonded titanium.

(b35) The first stage of the catalyst preparation was carried out as described in (b29).

After taking up in 100 ml of isooctane, 5 mmols of tetra-isobutoxytitanate were added at room temperature, while stirring. The suspension was then stirred for 1 hour at 50° C. After adding 20 mmols of $TiCl_4$, the suspension was heated to 90° C. and stirred for a further ½ hour.

The solid was washed analogously to (b29), and subsequently treated as in (b30).

The catalyst solid contained a total of 27 mmols of bonded titanium.

(b36) The catalyst was prepared as described in (b35), except that for the subsequent treatment (instead of ageing) the catalyst solid was suspended in 300 ml of isooctane, 2 ml of ethyl aluminum sesquichloride were added and the mixture was stirred for 1 hour at 50° C. and washed again at this temperature. The catalyst solid contained a total of 28.2 mmols of bonded titanium.

(b37) Reaction A followed by Reaction B 100 ml of the primary solid suspension produced according to (a), which contained 50 mmols of magnesium, were introduced into the reaction vessel and 5 mmols of tetratert-butoxytitanate were added at room temperature, while stirring. After heating to 50° C., stirring was carried out for 1 hour. 20 mmols of $TiCl_4$ were then added. The suspension was then heated to 90° C. and stirred for a further 3 hours. After cooling to 50° C., washing was carried out as described in (b31).

The solid contained 15.5 mmols of bonded titanium.

The preparation of the second stage was carried out analogously to (b31). The catalyst solid contained a total of 30.4 mmols of bonded titanium.

(c) Manufacture of Catalyst Solids Not According to the Invention (c1) 14 mmols of titanium tetrachloride were added to 100 ml of the primary solid suspension produced according to (a), which contained 50 mmols of magnesium, and the suspension was heated to 30° C. 14 mmols of ethyl aluminum sesquichloride, dissolved in 10 ml of isooctane, were then added to the suspension over a period of half-an-hour, while stirring, and the suspension was then stirred for a further 4 hours at 30° C. After heating to 50° C., the solid was washed as described in (b1). It contained 13.8 mmols of bonded titanium.

(c2) 15 mmols of aluminum triisopropylate were added at room temperature, while stirring, to 100 ml of the primary solid suspension, which contained 50 mmols of magnesium, and the suspension was heated to 50° C. and stirred for 1 hour at 50° C. After adding 100 mmols of $TiCl_4$ and heating to 80° C., the suspension was stirred for 1 hour and worked up analogously to (b1). The solid contained 16.2 mmols of bonded titanium.

(c3) 15 mmols of triisopropyl borate were added at room temperature, while stirring, to 100 ml of the primary solid suspension, which contained 50 mmols of magnesium, and the suspension was heated to 50° C. and stirred for 1 hour at 50° C. After adding 50 mmols of TiCl$_4$ and heating to 80° C., the suspension was stirred for 1 hour and worked up analogously to (b1). The solid contained 10.3 mmols of bonded titanium.

(c4) 15 mmols of tri-n-butyl borate were added at room temperature, while stirring, to 100 ml of the primary solid suspension produced according to (a), which contained 50 mmols of magnesium. After heating to 50° C., the suspension was stirred for 1 hour. 100 mmols of TiCl$_4$ were then added. The suspension was then heated to 90° C. and stirred for 3 hours.

After cooling to 50° C., the solid was washed at 50° C. analogously to (b1).

The solid contained 2.3 mmols of bonded titanium.

After taking up in 100 ml of isooctane, 15 mmols of TiCl$_4$, and then 15 mmols of ethyl aluminum sesquichloride dissolved in 7.5 ml of isooctane, were added at room temperature, while stirring. The suspension was then stirred for 1 hour at 50° C. and washed analogously to (b1).

The catalyst solid contained a total of 16.1 mmols of bonded titanium.

This catalyst was not prepared with a branched chain alkoxy compound.

(c5) 15 mmols of titanium tetrachloride and 30 mmols of ethyl aluminum sesquichloride, dissolved in 15 ml of isooctane, were added, at room temperature, while stirring, to 100 ml of the primary solid suspension produced according to (a), which contained 50 mmols of magnesium. After heating to 50° C., the suspension was stirred for 90 minutes and washed with isooctane at that temperature, with repeated sedimentation and decanting, until practically no aluminum or chloride could be detected in the decanted liquid.

The solid contained 14.2 mmols of bonded titanium.

After taking up in 100 ml of isooctane, 15 mmols of aluminum tri-n-propylate were added at room temperature, while stirring. The suspension was then stirred for 1 hour at 50° C. After adding 30 mmols of TiCl$_4$, the suspension was heated to 90° C. and stirred for a further half hour. After cooling to 50° C., washing was carried out again until practically no dissolved titanium could be detected in the decanted isooctane.

For subsequent treatment the solid was again suspended in 300 ml of isooctane and aged for 3 hours at 90° C. After repeated washing at 50° C. with isooctane, the catalyst solid contained a total of 15.3 mmols of bonded titanium.

This catalyst was not prepared with a branched-chain alkoxy compound.

(c6) 100 ml of the primary solid suspension produced according to (a), which contained 50 mmols of magnesium, were introduced into the reaction vessel and 15 mmols of TiCl$_4$ and 30 mmols of ethyl aluminum sesquichloride, dissolved in 15 ml of isooctane, were added at room temperature, while stirring. After heating to 50° C., the suspension was stirred for 1.5 hours and washed at that temperature, with repeated sedimentation and decanting, until practically no aluminum or chloride could be detected in the decanted liquid.

The solid contained 14.6 mmols of bonded titanium.

After taking up in 100 ml of isooctane, 15 mmols of n-propyl vanadate were added at room temperature, while stirring. The suspension was then stirred for 1 hour at 50° C. After adding 30 mmols of TiCl$_4$, the suspension was heated to 90° C. and stirred for a further ½ hour. After cooling to 50° C., washing was carried out again until practically no dissolved titanium could be detected in the decanted isooctane.

The catalyst solid contained a total of 14.5 mmols of bonded titanium and 7.6 mmols of bonded vanadium.

This catalyst was not prepared with a branched-chain alkoxy compound.

(c7) 15 mmols of tetra-isopropoxysilane were added at room temperature, while stirring, to 100 ml of the primary solid suspension produced according to (a), which contained 50 mmols of magnesium, and the suspension was heated to 50° C. and stirred at 50° C. for 1 hour. After adding 50 mmols of TiCl$_4$, and heating to 90° C., the suspension was stirred for 6 hours and worked up analogously to (b31).

The solid contained 12.4 mmols of bonded titanium.

(c8) 5 mmols of tetra-tert-butoxy titanate were added at room temperature, while stirring, to 100 ml of the primary solid suspension produced according to (a), which contained 50 mmols of magnesium, and the suspension was heated to 50° C. and stirred at 50° C. for 1 hour. After adding 20 mmols of TiCl$_4$ and heating to 90° C., the suspension was stirred for 3 hours and worked up analogously to (b31).

The solid contained 15.2 mmols of bonded titanium.

(c9) The first stage of the catalyst preparation was carried out as in (b29).

After taking up in 100 ml of isooctane, 15 mmols of tetra-n-butoxysilane were added at room temperature, while stirring. The suspension was then stirred for 1 hour at 50° C. After adding 40 mmols of TiCl$_4$, the suspension was heated to 95° C. and stirred for a further hour. After cooling to 50° C., the solid was washed analogously to (b29). The further treatment of the solid was carried out as described in (b30). It contained a total of 18.8 mmols of bonded titanium.

This catalyst was not prepared with a branched-chain alkoxy compound.

EXAMPLES 1–84 AND COMPARISON EXAMPLES A TO P

The polymerization of ethylene was carried out in a 5-liter laboratory autoclave in 3500 ml of isooctane, while stirring at 650 rpm, at a total pressure of 10 bar and the temperature indicated.

The tests and polymerization results are summarized in Tables 1, 2 and 3.

Whereas it was possible to extrude the products of Examples 1 to 84 "without melt fracture", the extruded products of Comparison Examples A to P exhibited marked melt fracture.

TABLE 1

| Examples and Comparison Examples | Catalyst produced according to | mgTi (1) | Activator Added 2 ml AlR$_3$ |
|---|---|---|---|
| 1 | (b) 1. | 18 | Al—isoprenyl |
| 2 | " | 18 | " |
| 3 | (b) 2. | 18 | " |
| 4 | " | 18 | " |
| 5 | " | 18 | Al(n-C$_8$H$_{17}$)$_3$ |
| 6 | (b) 3. | 15.1 | Al—isoprenyl |
| 7 | (b) 4. | 18 | " |
| 8 | " | 19.5 | " |
| 9 | " | 18 | Al(n-C$_8$H$_{17}$)$_3$ |
| 10 | (b) 5. | 15 | Al—isoprenyl |
| 11 | " | 15 | " |
| 12 | " | 20 | " |

TABLE 1-continued

| | | | | |
|---|---|---|---|---|
| 13 | (b) 6. | 18.4 | " | |
| 14 | " | 18.4 | " | |
| 15 | (b) 7. | 16.5 | " | |
| 16 | " | 16.5 | " | |
| 17 | " | 17.4 | Al(n-$C_8H_{17}$)$_3$ | |
| 18 | " | 18.8 | " | |
| 19 | (b) 8. | 16.6 | Al—isoprenyl | |
| 20 | " | 16.6 | " | |
| 21 | " | 16.5 | " | |
| 22 | " | 16.8 | " | |
| 23 | " | 18.0 | Al(n-$C_8H_{17}$)$_3$ | |
| 24 | (b) 9. | 17.2 | Al—isoprenyl | |
| 25 | " | 17.5 | " | |
| 26 | (b) 10. | 16.3 | " | |
| 27 | " | 15.4 | Al(n-$C_8H_{17}$)$_3$ | |
| 28 | (b) 11. | 19.0 | Al—isoprenyl | |
| 29 | " | 17.1 | " | |
| 30 | (b) 12. | 16.1 | " | |
| 31 | " | 15.2 | Al(n-$C_8H_{17}$)$_3$ | |
| 32 | (b) 13. | 14.9 | Al—isoprenyl | |
| 33 | " | 13.8 | Al(n-$C_8H_{17}$)$_3$ | |
| 34 | (b) 14. | 16.1 | " | |
| 35 | " | 16.1 | Al—isoprenyl | |
| 36 | " | 16.1 | " | |
| 37 | (b) 15. | 16.0 | " | |
| 38 | " | 18.0 | " | |
| A | (c) 1. | 9.2 | Al—isoprenyl | |
| B | " | 9.2 | Al(n-$C_8H_{17}$)$_3$ | |
| C | (c) 2. | 10.1 | Al—isoprenyl | |
| D | " | 10.1 | Al(n-$C_8H_{17}$)$_3$ | |
| E | (c) 3. | 8.0 | Al—isoprenyl | |
| F | " | 8.0 | Al(n-$C_8H_{17}$)$_3$ | |
| G | (c) 4. | 12.5 | Al—isoprenyl | |
| H | (c) 5. | 9.1 | " | |
| I | " | 9.1 | Al(n-$C_8H_{17}$)$_3$ | |

| Examples and Comparison Examples | Volume % in Gas Space | °C. | Time in Hours | gm Polyethylene |
|---|---|---|---|---|
| 1 | 24 | 90 | 1½ | 1190 |
| 2 | 19 | " | " | 1200 |
| 3 | 21 | " | " | 1170 |
| 4 | 26 | " | 1¾ | 1205 |
| 5 | 24 | " | " | 1250 |
| 6 | 20 | " | " | 1100 |
| 7 | 19 | " | 2 | 1210 |
| 8 | 30 | " | 1¾ | 1110 |
| 9 | 25 | " | " | 1150 |
| 10 | 24 | " | 2 | 1205 |
| 11 | 16 | " | " | 1270 |
| 12 | 25 | " | 1¾ | 1125 |
| 13 | 20 | " | " | 1185 |
| 14 | 26 | " | " | 1195 |
| 15 | 27 | " | 1½ | 1140 |
| 16 | 29 | " | " | 1150 |
| 17 | 24 | " | 1¾ | 1175 |
| 18 | 26 | " | 1½ | 1140 |
| 19 | 27 | " | 1¾ | 1190 |
| 20 | 30 | " | 1½ | 1120 |
| 21 | 26 | " | 1¾ | 1160 |
| 22 | 22 | " | 1½ | 1150 |
| 23 | 30 | " | 1¾ | 1120 |
| 24 | 26 | " | " | 1110 |
| 25 | 23 | " | " | 1180 |
| 26 | 27 | " | 1½ | 1240 |
| 27 | 24 | " | " | 1155 |
| 28 | 26 | " | " | 1170 |
| 29 | 23 | " | 1¾ | 1312 |
| 30 | 24 | " | 1½ | 1180 |
| 31 | 21 | " | " | 1240 |
| 32 | 25 | " | " | 1190 |
| 33 | 21 | " | 1¾ | 1215 |
| 34 | 22 | " | 1¼ | 1175 |
| 35 | 27 | " | " | 1130 |
| 36 | 34 | " | 1¾ | 1120 |
| 37 | 22 | " | 1½ | 1185 |
| 38 | 34 | " | 1¾ | 1180 |
| A | 30 | 85 | 1½ | 1080 |
| B | 30 | " | " | 1060 |
| C | 21 | 90 | " | 1120 |
| D | 21 | " | " | 1080 |
| E | 22 | " | " | 1180 |
| F | 22 | " | " | 1090 |
| G | 19 | " | " | 1240 |
| H | 21 | " | " | 1200 |
| I | 21 | " | " | 1140 |

| Examples and Comparison Examples | $MFI_5/F_{21.6}$ (Powder) | $MFI_5/F_{21.6}$ (Granulate) | Bulk Density gm/l | Proportion of Fines <100 μm in % |
|---|---|---|---|---|
| 1 | 0.66/15.5 | 0.63/18.3 | 415 | 0.1 |
| 2 | 0.28/16.4 | 0.25/18.1 | 420 | 0.1 |
| 3 | 0.35/16.6 | 0.33/19.3 | 425 | 0.2 |
| 4 | 0.61/15.1 | 0.58/18.3 | 435 | 0.1 |
| 5 | 0.19/16.8 | 0.17/18.9 | 420 | 0.1 |
| 6 | 0.63/15.2 | 0.54/18.1 | 405 | 0.1 |
| 7 | 0.26/17.3 | 0.24/19.6 | 375 | 0.1 |
| 8 | 1.3/15.4 | 0.1/19.3 | 375 | 0.2 |
| 9 | 0.45/16.9 | 0.38/19.3 | 380 | 0.0 |
| 10 | 0.66/14.5 | 0.6/17 | 430 | 0.0 |
| 11 | 0.33/14.8 | 0.27/17.5 | 420 | 0.0 |
| 12 | 1.1/14.2 | 0.98/16.6 | 435 | 0.2 |
| 13 | 0.36/15.8 | 0.34/17.9 | 395 | 0.0 |
| 14 | 0.56/15.4 | 0.46/17.1 | 395 | 0.2 |
| 15 | 0.38/17.4 | 0.37/20.3 | 365 | 0.1 |
| 16 | 0.56/16.6 | 0.54/20.2 | 370 | 0.1 |
| 17 | 0.15/19.3 | 0.15/19.3 | 385 | 0.0 |
| 18 | 0.38/17.6 | 0.37/19.7 | 400 | 0.2 |
| 19 | 0.23/18.3 | 0.20/20.5 | 405 | 0.0 |
| 20 | 0.56/17.0 | 0.50/21.6 | 390 | 0.2 |
| 21 | 0.48/17.3 | 0.44/20.5 | 420 | 0.0 |
| 22 | 0.17/18.8 | 0.17/19.4 | 415 | 0.1 |
| 23 | 0.55/17.1 | 0.53/20.2 | 425 | 0.1 |
| 24 | 0.39/16.9 | 0.35/18.9 | 395 | 0.0 |
| 25 | 0.18/18.3 | 0.18/18.9 | 377 | 0.1 |
| 26 | 0.42/18.6 | 0.34/20.6 | 360 | 0.0 |
| 27 | 0.21/19.5 | 0.17/21.8 | 355 | 0.0 |
| 28 | 0.38/19.2 | 0.27/21.9 | 396 | 0.0 |
| 29 | 0.25/19.2 | 0.19/21.1 | 399 | 0.0 |
| 30 | 0.46/17.4 | 0.44/20.0 | 390 | 0.1 |
| 31 | 0.27/17.8 | 0.26/19.8 | 390 | 0.1 |
| 32 | 0.65/16.3 | 0.54/19.8 | 375 | 0.2 |
| 33 | 0.23/17.0 | 0.19/19.5 | 380 | 0.1 |
| 34 | 0.24/17.9 | 0.20/19.5 | 360 | 0.2 |
| 35 | 0.48/17.9 | 0.44/20.7 | 375 | 0.2 |
| 36 | 1.30/16.9 | 1.20/20.6 | 385 | 0.0 |
| 37 | 0.31/19.4 | 0.28/20.7 | 413 | 0.0 |
| 38 | 1.40/17.5 | 1.10/24.8 | 417 | 0.2 |
| A | 1.4/14.3 | — | 370 | 0.6 |
| B | 0.52/14.8 | — | 360 | 0.5 |
| C | 0.8/12.4 | — | 370 | 0.1 |
| D | 0.4/13.1 | — | 375 | 0.1 |
| E | 1.1/11.5 | — | 360 | 0.3 |
| F | 0.7/12.1 | — | 350 | 0.2 |
| G | 0.37/15.8 | — | 445 | 0.0 |
| H | 0.90/12.0 | — | 390 | 0.2 |
| I | 0.55/13.0 | — | 380 | 0.3 |

(1) Bonded to the catalyst solid.

TABLE 2

| Examples and Comparison Examples | Catalyst Produced According to | mg Ti (1) | Activator added 2 ml $AlR_3$ | Vol-% $H_2$ in Gas Space | °C. | Time in Hours | gm Polyethylene | $MFI_5/F_{21.6}$ (Powder) | $MFI_5/F_{21.6}$ (Granulate) | Bulk Density gm/l | Proportion of Fines <100 μm in % |
|---|---|---|---|---|---|---|---|---|---|---|---|
| 39 | (b16) | 16.5 | Al—isoprenyl | 30 | 90 | 1½ | 1250 | 1.1/19.5 | 1.0/21.8 | 355 | 0.2 |
| 40 | " | 12 | " | " | " | 1½ | 1200 | 0.65/21.7 | 0.64/21.1 | 350 | 0.1 |
| 41 | (b17) | 16.2 | Al(n-$C_8H_{17}$)$_3$ | 23.5 | " | 1½ | 1275 | 0.47/15.7 | 0.42/18.9 | 350 | 0.1 |
| 42 | " | " | Al—isoprenyl | 18.0 | " | 1½ | 1300 | 0.24/17.5 | 0.12/20.5 | 355 | 0 |
| 43 | " | " | " | 30 | " | 2 | 1230 | 0.98/17.4 | 0.94/19.4 | 370 | 0.1 |

TABLE 2-continued

| Examples and Comparison Examples | Catalyst Produced According to | mg Ti (1) | Activator added 2 ml AlR$_3$ | Vol-% H$_2$ in Gas Space | °C. | Time in Hours | gm Poly-ethylene | MFI$_5$/F$_{21.6}$ (Powder) | MFI$_5$/F$_{21.6}$ (Granulate) | Bulk Density gm/l | Proportion of Fines <100 μm in % |
|---|---|---|---|---|---|---|---|---|---|---|---|
| 44 | (b18) | 18.1 | " | 29.5 | " | 2 | 1110 | 0.4/18.3 | 0.36/19.4 | 440 | 0.1 |
| 45 | " | 19.6 | " | 23.5 | " | 1¾ | 1100 | 0.25/18.8 | 0.18/22.4 | 425 | 0.1 |
| 46 | " | 22 | Al(n-C$_8$H$_{17}$)$_3$ | 37.5 | " | 1¾ | 1040 | 0.97/18.4 | 0.94/18.9 | 430 | 0 |
| 47 | (b19) | 18 | Al—isoprenyl | 26.5 | " | 2 | 1110 | 0.35/16.6 | 0.33/18.3 | 430 | 0 |
| 48 | " | 24 | " | 33.5 | " | 2 | 1000 | 0.5/17.5 | 0.45/18.6 | 435 | 0 |
| 49 | (b20) | 17.7 | " | 20 | " | 2 | 1160 | 0.37/15.6 | 0.31/16.2 | 415 | 0 |
| 50 | (b21) | 15.2 | " | 20 | " | 1¾ | 1195 | 0.5/15.8 | 0.42/18.1 | 430 | 0.2 |
| 51 | " | 17.1 | " | 27.5 | " | 1¾ | 1250 | 1.3/15.6 | 1.1/17.2 | 440 | 0.1 |
| 52 | (b22) | 20 | " | 23.5 | " | 1½ | 1240 | 0.37/17.8 | 0.3/21 | 395 | 0 |
| 53 | " | " | " | 24.5 | " | 1½ | 1185 | 0.52/18.5 | 0.48/21.9 | 390 | 0.1 |
| 54 | (b23) | 18.6 | " | 23.5 | " | 1½ | 1190 | 0.36/18.9 | 0.28/25 | 395 | 0 |
| 55 | " | " | " | 30.0 | " | 1½ | 1150 | 0.67/19.4 | 0.62/21.6 | 405 | 0.2 |
| 56 | " | 19 | Al(n-C$_8$H$_{17}$)$_3$ | 23.5 | " | 1½ | 1200 | 0.36/17.2 | 0.30/19.7 | 385 | 0.1 |
| 57 | " | 20 | " | 26.5 | " | 1¾ | 1130 | 1.2/16.8 | 1.0/20.2 | 395 | 0 |
| 58 | (b24) | 18.4 | Al—isoprenyl | 26.5 | " | 2¼ | 1140 | 0.41/18.3 | 0.35/20.6 | 405 | 0 |
| 59 | " | " | " | 20.0 | " | 1¾ | 1230 | 0.22/19.1 | 0.2/19.5 | 400 | 0 |
| 60 | (b25) | 18.9 | " | 23.5 | " | 1¼ | 1145 | 0.27/17.4 | 0.23/20.0 | 385 | 0 |
| 61 | " | " | " | 33.5 | " | 1¾ | 1095 | 1.0/17.5 | 0.89/19.7 | 395 | 0 |
| 62 | (b26) | 14.2 | " | 20 | " | 1¾ | 1225 | 0.44/15.2 | 0.34/19.1 | 395 | 0.2 |
| 63 | (b27) | 18 | " | 24.5 | " | 1¾ | 1120 | 0.54/15.1 | 0.4/18.9 | 365 | 0.1 |
| 64 | " | 20 | " | 31 | " | 1¾ | 1070 | 1.2/15.9 | 1.0/19.4 | 375 | 0 |
| 65 | (b28) | 19 | " | 28 | " | 1½ | 1080 | 0.53/16.4 | 0.46/18.6 | 405 | 0 |
| J | (c6) | 13.5 | Al—isoprenyl | 24.5 | 90 | 1¾ | 1270 | 1.6/11.9 | 1.3/13.1 | 425 | 0.2 |

(1) Bonded to the catalyst solid

TABLE 3

| Examples and Comparison Examples | Catalyst Produced According to | mg Ti (1) | Activator added 2 ml AlR$_3$ | Vol-% H$_2$ in Gas Space | °C. | Time in Hours | gm Poly-ethylene | MFI$_5$/F$_{21.6}$ (Powder) | MFI$_5$/F$_{21.6}$ (Granulate) | Bulk Density gm/l | Proportion of Fines <100 μm in % |
|---|---|---|---|---|---|---|---|---|---|---|---|
| 66 | (b29) | 17.5 | Al—isoprenyl | 24 | 90 | 2 | 1095 | 0.19/18.4 | 0.18/21.6 | 360 | 0.2 |
| 67 | " | 18.9 | " | 27.5 | " | 1½ | 1005 | 0.38/17.4 | 0.34/20.0 | 390 | 0.0 |
| 68 | (b30) | 18.5 | " | 24 | " | 1½ | 1190 | 0.22/16.4 | 0.21/19.0 | 360 | 0.0 |
| 69 | " | 20.3 | " | 35 | " | 2 | 1120 | 0.99/16.3 | 0.93/18.5 | 370 | 0.0 |
| 70 | " | 18.5 | " | 27.5 | " | 1¾ | 1182 | 0.41/17.1 | 0.39/18.2 | 370 | 0.1 |
| 71 | (b31) | 15.6 | " | 18.0 | " | 1½ | 1135 | 0.51/15.7 | 0.43/17.4 | 405 | 0.1 |
| 72 | " | 15.6 | Al(n-C$_8$H$_{17}$)$_3$ | 29 | " | 2 | 1175 | 1.4/15.1 | 1.1/17.0 | 430 | 0.1 |
| 73 | (b32) | 14 | Al—isoprenyl | 17.5 | " | 1½ | 1245 | 0.31/16.5 | 0.24/18.8 | 410 | 0.3 |
| 74 | " | 14 | " | 24.0 | " | 1½ | 1205 | 1.0/15.3 | 0.9/17.1 | 425 | 0.3 |
| 75 | (b33) | 13.5 | " | 24.0 | " | 1½ | 1210 | 0.5/16.6 | 0.43/19.3 | 380 | 0.1 |
| 76 | " | 12 | Al(n-C$_8$H$_{17}$)$_3$ | 22.0 | " | 1½ | 1230 | 0.29/16.6 | 0.24/20.4 | 365 | 0.1 |
| 77 | " | 13.5 | Al—isoprenyl | 30 | " | 1½ | 1130 | 1.4/16.8 | 1.2/18.3 | 390 | 0.2 |
| 78 | (b34) | 19 | " | 27 | " | 1¾ | 1085 | 0.46/15.7 | 0.32/20.9 | 375 | 0.2 |
| 79 | (b35) | 18 | " | 24 | " | 1½ | 1185 | 0.27/17.8 | 0.23/20.0 | 405 | 0.1 |
| 80 | " | 18 | " | 37.5 | " | 1¾ | 1100 | 1.0/17.4 | 1.0/18.4 | 410 | 0.2 |
| 81 | (b36) | 18.4 | " | 24 | " | 1 | 1170 | 0.29/19.3 | 0.26/21.2 | 415 | 0.1 |
| 82 | " | 18.4 | " | 31.5 | " | 1¾ | 1170 | 0.68/17.4 | 0.65/18.5 | 420 | 0.0 |
| 83 | (b37) | 17.5 | " | 24 | " | 1¾ | 1265 | 0.33/16.7 | 0.3/19.3 | 415 | 0.1 |
| 84 | " | 17.5 | " | 30 | " | 1¾ | 1185 | 1.1/15.3 | 1.0/18.2 | 420 | 0.2 |
| K | (c7) | 10.4 | Al—isoprenyl | 22 | 90 | 1½ | 1105 | 1.6/13.1 | — | 370 | 0.2 |
| L | " | 10.4 | Al(n-C$_8$H$_{17}$)$_3$ | 20 | " | 1½ | 1210 | 0.5/14.1 | 0.44/14.8 | 370 | 0.3 |
| M | (c8) | 10.8 | Al—isoprenyl | 22 | " | 1½ | 1160 | 1.4/13.9 | 1.2/14.6 | 380 | 0.1 |
| N | " | 10.8 | Al(n-C$_8$H$_{17}$)$_3$ | 20 | " | 1½ | 1220 | 0.4/14.2 | — | 380 | 0.2 |
| O | (c9) | 14.0 | Al—isoprenyl | 20 | " | 1 | 1170 | 0.43/16.3 | 0.32/16.9 | 375 | 0.0 |
| P | " | 14.0 | " | 26.5 | " | 1¼ | 1225 | 1.0/16.9 | 0.90/17.1 | 390 | 0.1 |

(1) Bonded to the catalyst solid

The preceding specific embodiments are illustrative of the practice of the invention. It is to be understood, however, that other expedients known to those skilled in the art or disclosed herein, can be employed without departing from the spirit of the invention or the scope of the appended claims.

I claim:

1. An improvement in the process for the polymerization of an at least one α-olefin comprising reacting said α-olefin under elevated temperatures and pressures in the presence of a solid polymerization catalyst consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen prepared from at least one hydrocarbon-soluble magnesium compound and at least one halogen compound selected from the group consisting of a chlorohydrocarbon having from 1 to 6 carbon atoms of which at least one carbon atom has at least two directly bonded chlorine atoms, a carbon chloride compound having from 1 to 6 carbon atoms, and mixtures thereof, in two successive and separate reacting stages A and B, in either order, where a solid based on magnesium compound(s) is reacted in reaction stage A in suspension in at least one liquid hydrocarbon with
  (i) at least one alkoxy compound of a metal selected from the group consisting of potassium, sodium, magnesium, calcium, zinc, boron, aluminum, silicon, tin, titanium, zirconium, phosphorus, vanadium and sulfur, said compound containing at least one alkoxy group having from 3 to 18 carbon atoms selected from the group consisting of secondary alkoxy and tertiary alkoxy, and
  (ii) at least one halogen-containing titanium compound of the formula $X_a Ti(OR^4)_{4-a}$ wherein X represents halogen, $R^4$ is a substituent selected from the group consisting of alkyl having 1 to 8 carbon atoms and hydrocarbon aryl having from 6 to 8 carbon atoms, and a is 2, 3 or 4, and, in reaction stage B, a solid based on magnesium compound(s) in suspension in at least one liquid hydrocarbon is reacted with
  (i) at least one halogen-containing titanium compound of the formula $X'_b Ti(OR^3)_{4-b}$ wherein X' represents halogen, $R^3$ represents a substituent selected from the group consisting of alkyl having from 1 to 8 carbon atoms and hydrocarbon aryl having from 6 to 8 carbon atoms, and b is 2, 3 or 4, and
  (ii) at least one organoaluminum compound, whereby a polymerizate is recovered having a broad molecular-weight distribution.

2. The process of claim 1 wherein said at least one halogen compound is a chloroalkane having from 1 to 6 carbon atoms where at least one carbon atom has at least two directly bonded chlorine atoms.

3. The process of claim 1 wherein said reaction stage B occurs before said reaction stage A.

4. The process of claim 1 wherein said reaction stage A occurs before said reaction stage B.

5. The process of claim 1 wherein said metal in said alkoxy compound is selected from the group consisting of silicon, boron and aluminum.

6. The process of claim 1 wherein component (ii) in stage A is titanium tetrachloride.

7. The process of claim 1 wherein component (i) in stage B is titanium tetrachloride.

8. The process of claim 1 or 2 wherein said catalyst solid, after completion of reaction stages A and B, is further washed with at least one liquid hydrocarbon, dispersed in at least one liquid hydrocarbon and reacted with at least one organometallic compound of metals of the II and/or III main group(s) of the Mendeleev Periodic Table, dissolved in at least one liquid hydrocarbon.

9. The process of claim 8 wherein said at least one organometallic compound is at least one organoaluminum compound.

10. The process of claim 1 or 2 wherein said catalyst solid, after completion of reaction stages A and B, is further suspended in at least one liquid hydrocarbon, aged for at least one hour at a temperature of from 50° C. to 100° C., and then washed with at least one liquid hydrocarbon.

11. The process of claim 1 or 2 wherein said organoaluminum compound is at least one organoaluminum compound selected from the group consisting of (1) compounds of the formula $AlR_z^{13} Y_{3-z}$ wherein $R^{13}$ represents a member selected from the group consisting of alkyl having from 1 to 20 carbon atoms, hydrocarbon aryl having from 6 to 20 carbon atoms and mixtures thereof, Y represents a member selected from the group consisting of hydrogen, halogen, alkoxy having from 1 to 20 carbon atoms, siloxy having from 1 to 20 carbon atoms and hydrocarbon aryl having from 6 to 20 carbon atoms, and z is 2 or 3, (2) oligomeric alkyl aluminum compounds, and (3) mixtures thereof.

12. The process of claim 1 wherein said α-olefin is a member selected from the group consisting of ethylene and mixtures of ethylene with up to 10 mol percent of α-alkenes having from 3 to 6 carbon atoms.

13. An improvement in the process for the polymerization of an at least one α-olefin comprising reacting an α-olefin selected from the group consisting of ethylene and mixtures of ethylene with up to 10 mol percent of α-alkenes having from 3 to 6 carbon atoms under elevated temperatures and pressures in the presence of a solid polymerization catalyst consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen prepared from at least one hydrocarbon-soluble magnesium compound and at least one halogen compound selected from the group consisting of a chlorohydrocarbon having from 1 to 6 carbon atoms of which at least one carbon atom has at least two directly bonded chlorine atoms, a carbon chloride compound having from 1 to 6 carbon atoms, and mixtures thereof, in two successive and separate reacting stages A and B, in either order, where a solid based on magnesium compound(s) is reacted in reaction stage A in suspension in at least one liquid hydrocarbon with
  (i) at least one alkoxy compound of a metal selected from the group consisting of potassium, sodium, magnesium, calcium, zinc, boron, aluminum, silicon, tin, titanium, zirconium, phosphorus, vanadium and sulfur, said compound containing at least one alkoxy group having from 3 to 18 carbon atoms selected from the group consisting of secondary alkoxy and tertiary alkoxy, and
  (ii) at least one halogen-containing titanium compound of the formula:

$X_a Ti(OR^6)_{4-a}$ wherein X represents halogen, $R^6$ is a substituent selected from the group consisting of alkyl having from 1 to 8 carbon atoms and hydrocarbon aryl having from 6 to 8 carbon atoms, and a is 2, 3 or 4, and, in reaction stage B, a solid based on magnesium compound(s) in suspension in at least one liquid hydrocarbon is reacted with (i) at least one halogen-containing metal titanium compound of the formula:

$$X'_b Ti(OR^7)_{4-b}$$

wherein X' represents halogen, R$^7$ represents a substituent selected from the group consisting of alkyl having from 1 to 8 carbon atoms and hydrocarbon aryl having from 6 to 8 carbon atoms, and b is 2, 3, or 4, and (ii) at least one organoaluminum compound, whereby a polymerizate is recovered having a broad molecular-weight distribution.

14. The process of claim 1 or 13 wherein said primary solid containing magnesium and halogen is purified before further reaction and said solid based on magnesium compounds(s) resulting from stage A or stage B are each purified before further processing.

15. The process of claim 14 wherein said purification after each stage is by washing with liquid hydrocarbons.

16. The process of claim 15 wherein said washing with liquid hydrocarbons is continued until said catalyst is substantially freed from soluble compounds.

* * * * *